US012323513B1

(12) United States Patent
Zhandry

(10) Patent No.: US 12,323,513 B1
(45) Date of Patent: Jun. 3, 2025

(54) ENHANCED SECURITY FOR PUBLIC KEY CRYPTOSYSTEMS FROM AUGMENTED RANDOM ORACLES

(71) Applicant: NTT Research, Inc., Sunnyvale, CA (US)

(72) Inventor: Mark Zhandry, Princeton, NJ (US)

(73) Assignee: NTT Research, Inc., Sunnyvale, CA (US)

( * ) Notice: Subject to any disclaimer, the term of this patent is extended or adjusted under 35 U.S.C. 154(b) by 260 days.

(21) Appl. No.: 18/193,562

(22) Filed: Mar. 30, 2023

Related U.S. Application Data

(60) Provisional application No. 63/325,588, filed on Mar. 30, 2022.

(51) Int. Cl.
*H04L 9/40* (2022.01)
*H04L 9/08* (2006.01)

(52) U.S. Cl.
CPC ................ *H04L 9/0869* (2013.01)

(58) Field of Classification Search
CPC ..................................... H04L 9/0869
See application file for complete search history.

(56) References Cited

U.S. PATENT DOCUMENTS

2003/0081785 A1\* 5/2003 Boneh ............... H04L 9/0847
380/277
2021/0150522 A1\* 5/2021 Trevethan ............ H04L 9/0825

OTHER PUBLICATIONS

Bindel et al., "Tighter Proofs of CCA Security in the Quantum Random Oracle Model", 2019, pp. 61-90 (Year: 2019).\*

\* cited by examiner

*Primary Examiner* — Thaddeus J Plecha
(74) *Attorney, Agent, or Firm* — CipherLaw

(57) ABSTRACT

A public key cryptosystem has enhanced security based on the use of an augmented random oracle model (AROM). The system includes corresponding encryption and decryption functionality.

20 Claims, 3 Drawing Sheets

ENHANCED SECURITY FOR PUBLIC KEY CRYPTOSYSTEMS FROM AUGMENTED RANDOM ORACLES

CROSS-REFERENCE TO RELATED APPLICATIONS

This application claims the benefit of U.S. Provisional Application No. 63/325,588, filed Mar. 30, 2022, the entire contents of which are incorporated herein by reference.

FIELD OF THE INVENTION

The invention relates to an improved method for public key encryption based on augmented random oracles.

BACKGROUND OF THE INVENTION

1 Introduction

The random oracle model (ROM) treats a cryptographic hash function as a random function, and is a crucial tool for analyzing the security of cryptosystems that otherwise lack a "standard model" security proof. This model captures most practical cryptographic techniques and attacks involving hash functions. Constructions with ROM proofs are often far more efficient than their standard-model counterparts, and numerous applied cryptosystems utilize this model.

Unfortunately, there are numerous examples of ROM failures, schemes that have been proven secure in the ROM but are insecure when the hash function is instantiated. The most problematic such failures are uninstantiability results, where the protocol is insecure under any instantiation of the hash function. This makes it challenging to understand the meaning of a ROM proof, and has lead to significant debate. Nevertheless, due to their efficiency, schemes with only ROM proofs remain widely deployed.

This practice is often justified by observing that ROM uninstantiabilities are typically contrived, deviating from standard cryptographic design. However, there are also examples of natural uninstantiabilities, even those for design structures widely used in practice, though this has never lead to actual real-world attacks. We will discuss several examples later in this work. In light of this state-of-affairs, it is important to further understand the security of ROM protocols.

Techniques for uninstantiability results. Digging deeper, all known ROM uninstantiability results make essential use of non-black-box techniques. They use that real hash functions have code which can be plugged into tools like proof systems, fully homomorphic encryption, program obfuscation, etc. Random oracles, by contrast, cannot be plugged into such tools as they have no code. The ROM uninstantiabilities therefore embed a trigger that can only be accessed by feeding the hash function code into such a tool; this trigger completely breaks security.

More generally, even when considering non-black box tools, essentially all cryptographic techniques use the component systems as black boxes. Even though non-black box tools take programs as input, the programs themselves only treat the component as a black box. The application of these tools does not care about the actual code of components, other than the fact that it has code in the first place. Of course, the implementation of the non-black-box tool will operate on the actual code at the gate or instruction level, but the tool abstracts all this away. The application of the tool only cares that the code exists.

1.1 Augmented Random Oracles

In this work, with the goal of eliminating uninstantiability results, we propose a new paradigm for studying ROM constructions that we call the Augmented Random Oracle Model (AROM). In addition to a random oracle O, we add a second oracle M, which will model the various non-black-box tools that ROM impossibilities may try to employ. Like O, M will be a function sampled from a distribution. Once M is sampled, it is fixed an immutable, keeping no state. Though M is stateless, it can still implement potentially stateful cryptographic objects, by having any state be an explicit input and output of M. Modeling M as stateless reflects the real world, where the specification of a cryptographic primitive does not change over time. However, to model tools that can be applied to the code of concrete hash function (which is now an oracle), we will have M be oracle aided, meaning it can make queries to O. Making queries is the only way M can learn information from O. Looking ahead, we will often have M take as input programs that themselves query O; M can then evaluate such programs by making queries to O. In this way, we can treat O as having code, namely the instruction to make a query, while still representing O as an oracle, thus capturing the aforementioned non-black-box techniques within our idealized model.

1.2 Best Possible Hash Functions

There have been numerous works on circumventing ROM impossibilities, or at least making ROM proofs more believable. Here, we discuss one, which seeks to identify and instantiate random oracle security properties using concrete, usually algebraic, hash functions. Examples include oracle hashing, non-malleable point obfuscation, various forms of correlation resistance, and Full Domain Hash, to name a few.

A major downside of these results is efficiency. In essentially all cases, the construction is far less efficient than standard hash functions such as SHA2, sometimes being entirely impractical. In addition, the computational assumptions underlying these ROM-free constructions can be quite strong, and it is not clear if the standard model result is actually "more secure."

In light of these downsides, a standard-model instantiation of a ROM protocol may be considered a proof of concept, showing that such an application is likely to exist. This could be seen as additional justification for the security (or at least, lack of impossibility) for the more efficient ROM protocol. Implicit in this interpretation is the following assumption: if a security property holds for some hash function, then it also holds for a sufficiently well-designed hash function, perhaps SHA2. That is, SHA2 is a "best possible" hash function, in that any security property which holds for some hash function will hold for SHA2. There will always be functionalities that SHA2 or other hash functions cannot achieve. This assumption is only about security properties that apply to any hash function. This sounds plausible, even in light of the various ROM impossibility results, as no poly-time attacks have been found on SHA2 that does not also apply to all hash functions.

1.3 a Classification of ROM Failures

Besides uninstantiability results, there are a number of other known ROM failures. Here, we broadly organize known ROM failures into five types, and discuss what they mean and their relevance to the AROM.

Type 1 (∃∃). Here, there exists a specific protocol with a ROM proof and also a specific hash function H, such that setting O=H makes the protocol insecure.

A well-known example is the length-extension attack when using Merkle-Damgård as MACs without appropriate padding. Another example is the circularly secure encryption scheme Enc(k, m)=(r, O(k, r)⊕(m), which was proven in the ROM, but is insecure when O is replaced with Davies-Meyer.

For Type 1 failures, the insecurity may point to an issue with the protocol, the hash, or both. However, we observe that in most cases, the particular hash function is not indifferentiable from a random oracle. Indifferentiability has become an important consideration for hash functions, and so an indifferentiability failure should be interpreted as a weakness of the hash function. In particular, using an indifferentiable hash function seems to solve the problem.

More generally, any Type 1 failure will point to a hash function design structure that, if avoided, would block the attack. Such a design structure may then be considered sub-optimal from a security standpoint.

Type 2 (∀∃). Here, for any possible hash function H, there exists a protocol with a ROM proof such that setting O=H makes the protocol insecure.

Type 2 failures were already pointed out. For a typical example, consider the Encrypt-with-Hash (EwH) transform Enc'(pk, m)=Enc(pk, m; O(pk, m)) which converts a randomized public key encryption scheme into a deterministic one by setting the random coins to O(pk, m). For any concrete hash function H, there is an Enc that renders the transform trivially insecure when O=H: Enc(pk, m; r) checks if r=O(pk, m) and if so outputs m in the clear.

For Type 2 failures, we observe that the ROM security is an artifact of the ROM modeling. But certainly a real-world encryption scheme may evaluate a given hash function. In fact, since there are a limited number of standardized hash functions, it is even expected that different components of a cryptosystem may use the same hash. So a better modeling would allow Enc to query O, in which case EwH is trivially insecure in the ROM for the same reasons as in the standard model. Therefore, Type 2 failures can be seen as demonstrating an issue with the particular protocol design, but not the random oracle itself if properly modeled. Instead, it shows that the scheme should never have been considered to have a ROM proof in the first place.

We observe that our AROM always allows the building block to query O (since M may implement a query-forwarding functionality), so failures of this sort are captured by the AROM, in the sense that such protocols will not have AROM proofs. We note that a tweaked EwH, namely Enc'(pk', m)=Enc(pk, m; O(s, m)) for pk'=(pk, s) and a uniformly random s would be secure in the ROM, even if Enc can make random oracle queries. The reason, essentially, is that the random s enforces domain separation, since Enc would almost certainly never evaluate O on inputs of the form (s, m).

Type 3 (∃∀). Here, there exists a protocol with a ROM proof that is insecure under any possible instantiation of the hash function.

These are the uninstantiability results motivating our AROM. As observed above, for fully abstracted transforms, no known Type 3 failures apply to the AROM.

Type 4 (Simulation-based). Here, security is defined via a simulator, and in the ROM the simulator is allowed to program the random oracle.

Examples include non-interactive zero knowledge without a CRS and non-interactive non-committing encryption, both of which exist in the ROM under this modeling of simulators, but not in the real world. The intuition for these failures is that, in the standard model, the simulator is usually required to have extra power relative to the adversary—such as being able to program a CRS or generate transcript messages out of order—in order to not be trivially impossible. Since the adversary cannot program the random oracle, allowing the simulator such programming ability is another form of extra power, allowing it to circumvent standard-model impossibilities without having to resort to CRS's or out-of-order transcript generation. This allows for attainable simulation-based definitions that are impossible in the standard model.

One problem with Type 4 failures is that the random oracle is baked into the security definition since the definition must model the simulator's ability to program the random oracle. This makes the ROM definition actually distinct from the standard model definition. Failures of this type are typically easily avoided by better modeling of the ROM: allow the simulator to make random oracle queries, and even see the adversary's queries, but do not allow the simulator to actually program the random oraclemodeling is referred to as the non-programmable random oracle model. However, the non-programmable random oracle model is often taken to mean a model where the reduction also cannot program the random oracle. This is an even more restrictive model than preventing only simulators from random oracle programming. The resulting definition then closely mirrors the standard model, and the only options available to give the simulator the needed extra power are generally the same strategies as in the standard model. For these reasons, we advocate similar modeling of simulators in the AROM.

Type 5 (Proof impossibilities). Here, it is proved that, for some protocol with a ROM proof, there cannot be any standard-model proof relative to any hash function, at least with respect to certain classes of constructions, proof strategies, and/or underlying computational assumptions.

A well-known example is Full-Domain Hash (FDH), it has been shown that there is no proof of security in the standard model that makes fully black box use of the trapdoor permutation. A wide class of examples of this type are impossibilities of security proofs relative to "falsifiable" assumptions. Examples include Fiat-Shamir even when restricted to statistically sound proofs. The Type 3 counter-example uses computationally sound protocols, succinct non-interactive arguments (SNARGs), and correlated input security. We note that correlated input security is in particular implied by the notion of security we prove in the AROM for EwH.

With Type 5 examples, no actual insecurity is shown, just a barrier to proving security. It could therefore be that the examples are in fact secure, but just cannot be demonstrated secure by standard model arguments. An optimistic interpretation is that such examples are actually demonstrating limits of the usual paradigm for provable security, with the ROM offering a way to plausibly justify the security of such protocols. However, in light of Type 3 failures, a pessimistic interpretation could simply be that Type 5 examples are simply insecure. The right answer probably lies somewhere between.

Nevertheless, protocol designs subject to Type 5 failures have been confidently used in practice, such as Fiat-Shamir (not to mention FDH and SNARGs). It is therefore important to try to justify their security despite such Type 5 failures. We can therefore view the AROM as offering additional support for the security of such schemes. This is particularly relevant for our AROM proofs of EwH and Fiat-Shamir for statistically sound proofs, as a standard-model security justification is infeasible.

BRIEF SUMMARY OF THE INVENTION

In Section 3 we formally define the AROM.

We then use the EwH transform as a case study to demonstrate the power of the AROM. We explain how the AROM captures the uninstantiability of EwH, in the sense that the transform is insecure in the AROM, like in the real world.

We show the EwH uninstantiability result can be generalized to work under a circular security assumption on LWE, as opposed to needing the full power of indistinguishability obfuscation. Concretely, our impossibility uses fully homomorphic encryption and obfuscation for compute-and-compare programs. The improvement also readily adapts to the FO transform. This further demonstrates the need for a model which captures a variety of non-black-box tools.

We show that EwH is secure in the AROM, if the underlying encryption scheme is strengthened to be lossy. Lossy encryption can still be constructed efficiently from most standard tools. We note that the security we prove likely cannot be proven secure in the standard model, so some form of idealized model is inherent. Our proof offers the strongest justification yet for security.

We next study the FO and FS transformations, demonstrating that both are insecure in the AROM, again capturing the known uninstantiabilities. For FS, we show that it is sound in the AROM if the underlying proof has statistical soundness. Like EwH, FS even for such proofs likely cannot be proven secure in the standard model, necessitating some idealized model. Our proof offers the strongest justification yet for security in this case. We note that zero knowledge of plain Fiat-Shamir cannot be proved, since this would give NIZKs without a CRS. We explore several ways of obtaining zero knowledge by introducing a CRS.

For FO, we observe that it is not secure in the AROM, even if the underlying encryption scheme is lossy. We therefore propose (Section 4.1) a new encryption scheme, which can be seen as a variant of the CCA-secure scheme of Dolev, Dwork, and Naor, but with the zero knowledge proof replaced by an EwH-style structure. We prove CCA security of our scheme under the assumed lossiness of the underlying encryption scheme; CCA security is not known to follow from lossy encryption in the standard model.

A pair of natural security properties for hash functions, namely auxiliary input one-wayness and something we call anti-lossiness, can be satisfied by standard-model constructions, and are both trivially satisfied by random oracles. However, we show that these properties cannot both be satisfied simultaneously by any real hash function, assuming virtual grey box (VGB) obfuscation. This implies that SHA2 (or any hash for that matter) cannot be a "best possible" hash.

In the AROM, only one of the two properties namely anti-lossiness hold for 0, consistent with the standard model. This gives further support to the utility of our model, and also indicates that SHA2 (or any hash function plausibly modeled as a random oracle) is likely not auxiliary input one-way.

BRIEF DESCRIPTION OF THE DRAWINGS

The accompanying drawings, which are included to provide further understanding and are incorporated in and constitute a part of this specification, illustrate disclosed embodiments, and together with the description, serve to explain the principles of the disclosed embodiments. In the drawings.

DETAILED DESCRIPTION

Figure 1:
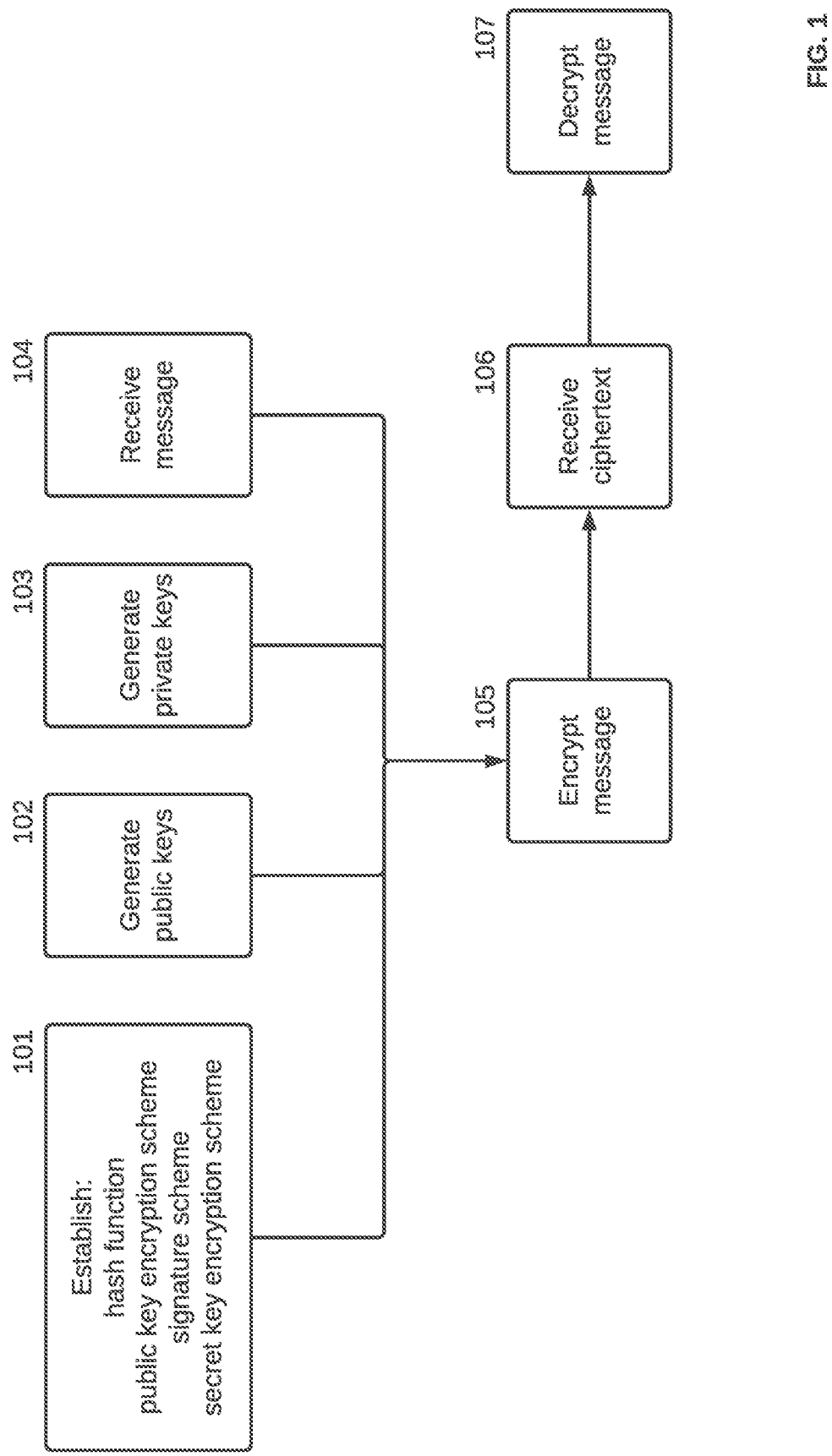
FIG. 1 illustrates an example method for encryption according to one embodiment.

We propose a new paradigm for justifying the security of random oracle-based protocols, which we call the Augmented Random Oracle Model (AROM). We show that the AROM captures a wide range of important random oracle impossibility results. Thus a proof in the AROM implies some resiliency to such impossibilities. We then consider three ROM transforms which are subject to impossibilities: Fiat-Shamir (FS), Fujisaki-Okamoto (FO), and Encrypt-with-Hash (EwH). We show in each case how to obtain security in the AROM by strengthening the building blocks or modifying the transform.

Along the way, we give a couple other results. We improve the assumptions needed for the FO and EwH impossibilities from indistinguishability obfuscation to circularly secure LWE; we argue that our AROM still captures this improved impossibility. We also demonstrate that there is no "best possible" hash function, by giving a pair of security properties, both of which can be instantiated in the standard model separately, which cannot be simultaneously satisfied by a single hash function.

2 Preliminaries 2.1 Cryptosystems and Games

A cryptosystem is a tuple of stateless deterministic algorithms $\Pi$. A specification for a cryptosystem is a collection $\mathcal{G}$ of game/probability pairs (G, p), where G take a security parameter $1^\lambda$ as input and outputs a bit b, and p takes a security parameter $1^\lambda$ as input and outputs a real number in [0,1]. Each G interacts with a cryptosystem $\Pi$ and adversary $\mathcal{A}$. We also assume G indicates whether adversaries are computationally bounded or unbounded. We will write $b \leftarrow (\mathcal{A} \leftrightarrow G^\Pi)(1^\lambda)$ to denote the interaction. The advantage of $\mathcal{A}$ when interacting with $G^\Pi$ is a function of $\lambda$ defined as $\text{Adv}_{\mathcal{A}, G^\Pi}(\lambda) := \Pr[1 \leftarrow (\mathcal{A} \leftrightarrow G^\Pi)(1^\lambda)] - p(\lambda)$. Games model both security properties and correctness properties.

Many cryptosystems will use random coins, which we model as an explicit input. Games will be responsible for choosing the random coins. We will often distinguish random coins from other inputs by separating them with a semicolon, e.g. $\Pi(x; r)$. We will write $\Pi(x)$ to be the distribution $\Pi(x; r)$ for uniform r. A function is negligible if it is asymptotically smaller than any inverse polynomial.

Definition 2.1. A cryptosystem $\Pi$ securely implements a specification $\mathcal{G}$ if, for all (G, p)$\in \mathcal{G}$ and for all adversaries $\mathcal{A}$, there exists a negligible function negl such that $\text{Adv}_{\mathcal{A}, G^\Pi}(\lambda) \leq \text{negl}(\lambda)$.

Transforms. A transform is a method T of compiling a cryptosystem $\Pi$ securely implementing a specification $\mathcal{G}$ into another cryptosystem $\Gamma$ securely implementing a specification $\mathcal{H}$. We write $\Gamma = T^\Pi$.

Definition 2.2. A transform T from $\mathcal{G}$ to $\mathcal{H}$ is secure if, for all $\Pi$ which securely implement $\mathcal{G}$, $T^\Pi$ securely implements $\mathcal{H}$.

Single-stage games. Usually, $\mathcal{A}$ is a single adversary that can keep arbitrary state throughout its interaction with $\mathcal{G}$. We will call these single-stage games. Some games place restrictions on the state $\mathcal{A}$ can keep. We call such games multi-stage.

2.2 Cryptographic Definitions

An $\ell = \ell(\lambda)$-source is a distribution is a family of efficiently sampleable distributions $D(1^\lambda)$ over tuples $(x_1, \ldots, x_\ell, \text{aux})$.

Definition 2.3 (Unpredictability). A 1-source $(x, \text{aux}) \leftarrow D(1^\lambda)$ is computationally (resp. statistically) unpredictable if, for all polynomial time (resp. unbounded) $\mathcal{A}$, $\Pr[\mathcal{A}(\text{aux}) = x : (x, \text{aux}) \leftarrow D(1^\lambda)]$ is negligible.

An $\ell$-source ($\ell > 1$) is computationally (resp. statistically) unpredictable (1) if each marginal distribution $(x_i, \text{aux})$ for $i \in [\ell]$ is computationally unpredictable, and (2) except with negligible probability the $x_i$ are all distinct.

Definition 2.4 (Anti-lossiness). A keyed function $H: \{0, 1\}^\lambda \times \{0, 1\}^{m(\lambda)} \to \{0, 1\}^{n(\lambda)}$ is anti-lossy if, for all sequences $(k_\lambda)_\lambda$ for $k_\lambda \in \{0, 1\}^\lambda$, the 1-source $(H(k_\lambda, x), \text{aux} = \{\})$ where $x \leftarrow \{0, 1\}^{m(\lambda)}$ is statistically unpredictable. In other words, there are no keys which make H lose too much information.

Definition 2.5 (One-wayness with correlated inputs). A keyed function $H: \{0, 1\}^\lambda \times \{0, 1\}^{m(\lambda)} \to \{0, 1\}^{n(\lambda)}$ is one-way against correlated inputs if, for all computationally unpredictable $\ell$-sources D and all polynomial-time $\mathcal{A}$, $$\Pr\left[\exists i, H(k, x') = y_i : \begin{array}{c} k \leftarrow \{0, 1\}^\lambda \\ (x_1, \ldots, x_\ell, \text{aux}) \leftarrow D \\ x' \leftarrow \mathcal{A}(k, y_1 = H(k, x_1), \ldots, y_\ell = H(k, x_\ell), \text{aux}) \end{array}\right] < \text{negl}(\lambda).$$

That is, given aux and all the $y_i = H(k, x_i)$, it is intractable to invert any of the $y_i$. H is one-way against auxiliary input if the above holds only for 1-sources.

Definition 2.6 (Pseudorandomness with correlated inputs). A keyed function $H: \{0, 1\}^\lambda \times \{0, 1\}^{m(\lambda)} \to \{0, 1\}^{n(\lambda)}$ is pseudorandom against correlated inputs if, for all computationally unpredictable $\ell$-sources and all polynomial-time $\mathcal{A}$, $$\left|\Pr\left[b' = b : \begin{array}{c} b \leftarrow \{0, 1\}, k \leftarrow \{0, 1\}^\lambda \\ (x_1, \ldots, x_\ell, \text{aux}) \leftarrow D \\ y_{i,0} \leftarrow H(k, x_i), y_{i,1} \leftarrow \{0, 1\}^{n(\lambda)} \forall i \\ b' \leftarrow \mathcal{A}(k, y_{1,b}, \ldots, y_{\ell,b}, \text{aux}) \end{array}\right] - 1/2\right| < \text{negl}(\lambda).$$

In other words, the vector of $y_i = H(k, x_i)$ is pseudorandom, even though the $x_i$ are correlated and aux is given. H is pseudorandom against auxiliary input if the above holds only for 1-sources.

Public key encryption (PKE). A PKE scheme is a triple $\Pi = (\text{Gen}, \text{Dec}, \text{Enc})$ such that $(\text{pk}, \text{sk}) \leftarrow \text{Gen}(1^\lambda) = \text{Gen}(1^\lambda; r)$, $c \leftarrow \text{Enc}(\text{pk}, m) = \text{Enc}(\text{pk}, m; r)$ and $m' \leftarrow \text{Dec}(\text{sk}, c)$. We require correctness, which insists that for every message m, $\Pr[\text{Dec}(\text{sk}, \text{Enc}(\text{pk}, m)) = m : (\text{pk}, \text{sk}) \leftarrow \text{Gen}(1^\lambda)] \geq 1 - \text{negl}(\lambda)$.

Definition 2.7 (CPA and CCA security). A PKE scheme $\Pi$ is CCA secure if all polynomial time $\mathcal{A}$ have negligible advantage in the following game:

On input $1^\lambda$, the game samples $(\text{pk}, \text{sk}) \leftarrow \text{Gen}(1^\lambda)$ and sends pk to $\mathcal{A}$.

$\mathcal{A}$ makes CCA queries on ciphertexts c, and receives $m \leftarrow \text{Dec}(\text{sk}, c)$.

At some point, $\mathcal{A}$ produces two messages $m^*_0, m^*_1 \in \{0, 1\}^*$ of equal length.

The game samples a random bit b and replies with $c^* \leftarrow \text{Enc}(\text{pk}, m^*_b)$.

$\mathcal{A}$ can continue making CCA queries, as long as $c \neq c^*$.

$\mathcal{A}$ finally sends a guess b' for b. The advantage of $\mathcal{A}$ is $|\Pr[b' = b] - 1/2|$.

$\Pi$ is CPA secure if the above only holds against $\mathcal{A}$ that cannot make CCA queries.

Definition 2.8 (Lossy Encryption). A PKE scheme $\Pi$ is lossy if there is an additional algorithm $\text{pk} \leftarrow \text{GenLossy}(1^\lambda)$ such that:

$\text{pk} \leftarrow \text{GenLossy}(1^\lambda)$ is comp. indist. from pk where $(\text{pk}, \text{sk}) \leftarrow \text{Gen}(1^\lambda)$.

Let $D_m$ be the distribution $(\text{pk}, \text{Enc}(\text{pk}, m))$ where $\text{pk} \leftarrow \text{GenLossy}(1^\lambda)$. Then for any messages m, m' of the same length, $D_m, D_{m'}$ are statistically close.

Definition 2.9 (Fully Homomorphic Encryption). A PKE scheme $\Pi$ is fully homomorphic if there is an additional algorithm $\text{Eval}(\text{pk}, c, f)$ that outputs ciphertexts, such that for all m and all functions $f$ represented as circuits, the following hold:

length(Eval(pk, Enc(pk, m), $f$)) = length(Enc(pk, $f$(m))), and $$\Pr\left[\text{Dec}(\text{sk}, c') = f(m) : \begin{array}{c} (\text{pk}, \text{sk}) \leftarrow \text{Gen}(1^\lambda) \\ c \leftarrow \text{Enc}(\text{pk}, m) \\ c' \leftarrow \text{Eval}(\text{pk}, c, f) \end{array}\right] \geq 1 - \text{negl}(\lambda).$$

Deterministic Encryption. A deterministic PKE scheme is plain PKE, except that Enc is deterministic. Deterministic PKE can only be secure for unpredictable messages, formalized by PRIV security:

Definition 2.10 (PRIV-CPA and PRIV-CCA). A det. PKE scheme H is strongly (resp. weakly) PRIV CCA secure if for all computationally (resp. statistically) unpred. $\ell$-sources D, all polynomial time $\mathcal{A}$ have negligible advantage in the following game (where the original PRIV notion corresponds to the weak version):

On input $1^\lambda$, the game samples $(\text{pk}, \text{sk}) \leftarrow \text{Gen}(1^\lambda)$ and sends pk to $\mathcal{A}$.

It samples $(m^*_{1,0}, \ldots, m^*_{\ell,0}) \leftarrow D$ and random distinct $m^*_{1,1}, \ldots, m^*_{\ell,1}$.

It samples a random bit b, and sends $c^*_1, \ldots, c^*_\ell$ where $c^*_i \leftarrow \text{Enc}(\text{pk}, m^*_{i,b})$.

$\mathcal{A}$ makes CCA queries on $c \notin \{c^*_1, \ldots, c^*_\ell\}$; it receives $m \leftarrow \text{Dec}(\text{sk}, c)$.

$\mathcal{A}$ finally sends guess b' for b. The advantage of $\mathcal{A}$ is $|\Pr[b' = b] - 1/2|$.

$\Pi$ is strongly/weakly PRIV-CPA secure if $\mathcal{A}$ cannot make CCA queries.

Obfuscation. An obfuscator $\text{Obf}(1^\lambda, C)$ is an efficient randomized function which maps circuits to circuits. We can also consider obfuscators for uniform computational models, but we will not need to for this work. For correctness, we require that $Obf(1^\lambda, C)(x)=C(x)$ for all $\lambda$, x. We will also consider obfuscators that only work on circuits of a particular format. We now discuss two notions of security.

Definition 2.11 (VGB). Obf is VGB secure if, for all polynomial-time $\mathcal{A}$, all polynomials s, and all inverse polynomials p, there exists a simulator S that is computationally unbounded but which can only make a polynomial number of queries, such that for all circuits C of size at most $s(\lambda)$, $|Pr[1 \leftarrow \mathcal{A}(1^\lambda, Obf(1^\lambda, C))] - Pr[1 \leftarrow S^C(1^\lambda)]| < p(\lambda)$.

VGB obfuscation is not known under standard assumptions, but it appears plausible that many existing iO constructions satisfy it. Regardless, ruling out VGB obfuscation appears challenging. As we only use VGB for an impossibility, it is still meaningful even if none of the existing candidates are secure. A weakening of VGB obfuscation is indistinguishability obfuscation (iO), which is identical except that S can also be query unbounded. An equivalent formulation of iO is that the obfuscations of equivalent programs are computationally indistinguishable.

Definition 2.12 (CC security). For a polynomial s, consider the class of binary circuits of the form "Output 1 on input x if and only if $C(x)=y$" where $y \in \{0, 1\}^\lambda$ and C has size s. Call this circuit $CC_{C,y}(x)$. An obfuscator Obf is a compute-and-compare (CC) obfuscator if it is correct for this class of circuits, and satisfies the following security definition: there exists an efficient simulator S such that for all C and all efficient $\mathcal{A}$, $$\left| Pr\left[ 1 \leftarrow \mathcal{A}(\tilde{C}): \begin{array}{c} y \leftarrow \{0,1\}^\lambda \\ \tilde{C} \leftarrow Obf(1^\lambda, CC_{C,y}) \end{array} \right] - Pr[1 \leftarrow \mathcal{A}(S(1^\lambda, 1^s))] \right| < negl(\lambda).$$

Thas is, if y is random, the obfuscated program can be simulated without knowing C or y at all. It is possible to construct CC-secure obfuscation from LWE.

3 the Augmented Random Oracle Model 3.1 The Plain ROM

In the plain ROM, there is a function $O:\{0,1\}^* \to \{0,1\}^\ell$, where the output of O on any input is chosen uniformly at random. All parties can make queries to O. We call this distribution over oracles $\mathcal{O}$. Note that the choice of $\ell$ is arbitrary: one can obtain an O with $\ell$-bit outputs from an O' with 1-bit outputs by setting $O(x)_i=O(x\|i)$. One can even obtain O with infinite outputs in this way. Thus, all random oracles are equivalent.

Complexity Metrics. A query x to O has cost |x|. The query complexity of an algorithm is the total cost of all its queries. The computational complexity is the sum of its query complexity and running time. Both the query and computational complexities of an algorithm can be input-specific. Note the cost must increase with input size to yield correct query complexity results for variable-length O.

Secure cryptosystems in the ROM. Specifications remain oracle-free, but now the cryptosystem $\Pi$ and adversary $\mathcal{A}$ can query O. We denote the interaction $b \leftarrow (\mathcal{A}^O \leftrightarrow G^{\Pi^O})$. $\mathcal{A}$'s advantage is defined as in the standard model, except that the probability is over the choice of $O \leftarrow \mathcal{O}$. Oracle-free specifications means simulators in simulation-based definitions cannot program O. This modeling, however, automatically captures Type 4 failures.

Definition 3.1. An oracle-aided cryptosystem $\Pi^O$ securely implements a specification $\mathcal{G}$ in the ROM, if, for all $(G, p) \in \mathcal{G}$ and for all oracle-aided adversaries $\mathcal{A}^O$, there is a negligible negl such that $Adv_{\mathcal{A}^O, G^{\Pi^O}}(\lambda) \leq negl(\lambda)$.

Transforms in the ROM. Transforms in the ROM use random oracles. Often in the literature, the underlying building block is prevented from making oracle queries; we will make no such restriction. This models the real world, where the building blocks could have themselves been built using hash functions.

Definition 3.2. An oracle-aided transform T between from $\mathcal{G}$ to $\mathcal{H}$ is secure in the ROM if, for all oracle-aided cryptosystems $\Pi^O$ which securely implement $\mathcal{G}$ in the ROM, $\Gamma^O = T^{O,\Pi^O}$ securely implements $\mathcal{H}$ in the ROM.

3.2 Augmented Random Oracles

In an augmented random oracle, first a function $O \leftarrow \mathcal{O}$ is sampled. Additionally, there is a distribution $\mathcal{M}$ over oracle-aided functions from which $M \leftarrow \mathcal{M}$ is sampled. O and M are sampled independently. Then, parties are provided with the oracles O and $M^O$; that is, M's own oracle is set to O. Once O, M are sampled, they are deterministic and stateless. Looking ahead, M will provide one or more abstract cryptosystems. M can still model stateful cryptosystems by having the state be an additional input and output. M itself being stateless corresponds to the typical real-world demand that abstract cryptosystem specifications do not change over time. Note that the restriction to deterministic M is without loss of generality, since any random coins can be provided as an additional input.

Query Complexity. We will treat M as outputting both the output, as well as an arbitrary cost for the query, which may or may not depend on in the input-size or complexity of answering the query. The query complexity of an algorithm making queries to M, O will be the total cost of all direct queries, excluding those M makes to O.

Complexity preserving. M is complexity preserving if the cost it outputs is at least the query complexity of M when answering that query. In this case, the query complexity of an algorithm is lower bounded by the total cost of all queries made to O, including those made by M. There is no cost upper bound.

Simulatable. M is simulatable if, for any distinguisher D, there is an efficient but stateful oracle-aided algorithm $S^O$ such that D cannot distinguish the oracles $(O, M^O)$ and $(O, S^O)$ except with negligible probability. Note that many oracles are simulatable via lazy sampling, such as random oracles and generic groups.

Secure cryptosystems in the AROM. Specifications themselves still remain oracle-free. Cryptosystems $\Pi$ are allowed to make queries to O and M, which we denote by $\Pi^{O,M^O}$. We denote the interaction $b \leftarrow (\mathcal{A}^{O,M^O} \leftrightarrow G^{\Pi^{O,M^O}})$. The advantage of $\mathcal{A}$ is defined similarly to the standard model, except that the probability is additionally over the choice of $O \leftarrow \mathcal{O}$ and $M \leftarrow \mathcal{M}$.

Definition 3.3. An oracle-aided cryptosystem $\Pi^{O,M^O}$ securely implements a specification $\mathcal{G}$ in the $\mathcal{M}$-AROM if, for all $(G, p) \in \mathcal{G}$ and for all oracle-aided adversaries $\mathcal{A}^{O,M^O}$, there exists a negligible function negl such that the advantage of $\mathcal{A}^{O,M^O}$ when interacting with $G^{\Pi^{O,M^O}}$ is at most negl.

Looking ahead, when actually designing cryptosystems, we generally do not want $\Pi$ to make queries to M. This is because M will model non-black-box techniques, which are generally inefficient in practice. We denote such a protocol by $\Pi^O$. In this case, we can quantify over all M, giving the unquantified AROM. Here we do make restrictions on M: namely we require M to be complexity preserving and simulatable.

Definition 3.4. An oracle-aided cryptosystem $\Pi^O$ (making no queries to M) securely implements $\mathcal{G}$ in the AROM (no quantification by $\mathcal{M}$) if it securely implements $\mathcal{G}$ in the $\mathcal{M}$-ROM for all complexity preserving simulatable $\mathcal{M}$.

Transforms in the ROM. Transforms in the (unquantified) AROM make use of O, but not M, for the same reasons as for cryptosystems. But we always allow the input cryptosystems to query M. This will model transform failures, which design input systems employing non-black-box techniques.

Definition 3.5. An oracle-aided transform $T^{O,\Pi}$ from $\mathcal{G}$ to $\mathcal{H}$ is secure in the AROM if, for all complexity preserving simulatable M, and all oracle-aided $\Pi^{O,\mathcal{M}^O}$ which securely implement $\mathcal{G}$ in the $\mathcal{M}$-AROM, $\Gamma^{O,\mathcal{M}^O} = T^{O,\Pi^{O,MO}}$ securely implements $\mathcal{H}$ in the $\mathcal{M}$-AROM.

3.3 Some Basic Results

We show that for direct cryptosystems (not transforms), the AROM and ROM are equivalent for single-stage games:

Theorem 3.6. If all games in $\mathcal{G}$ are single stage, then $\Pi^O$ securely implements a specification $\mathcal{G}$ in the AROM if and only if it securely implements $\mathcal{G}$ in the plain ROM.

An immediate corollary of Theorem 3.6 is that most standard-model properties one assumes of hash functions hold for O in the AROM; for example:

Corollary 3.7. In the AROM, O is one-way, collision resistant, a pseudorandom genera-tor, and anti-lossy.

Note, however, that Theorem 3.6 does not apply to one-wayness against auxiliary input, since that security definition is not single-stage. Anti-lossiness and auxiliary input one-wayness are incompatible in the standard model, and this incompatibility extends to the AROM. As such, O is not auxiliary input one-way in the AROM. We now prove Theorem 3.6.

Proof. Setting $\mathcal{M}$ to always outputs 0, we see that AROM security readily implies ROM security. In the other direction, consider any oracle distribution $\mathcal{M}$ and adversary $\mathcal{A}$ in the AROM. We replace $\mathcal{M}$ with $S^H$, only negligibly affecting the advantage of $\mathcal{A}$. Now we merge S and $\mathcal{A}$ into a single adversary $\mathcal{A}'$ for H in the plain ROM. $\mathcal{A}'$ is therefore still an adversary, provided the game is single-stage since it must remember the state of S. The complexity of $\mathcal{A}'$ is polynomially larger than the query complexity of $\mathcal{A}$ (since $\mathcal{M}$ is complexity preserving). Therefore, the overall computational complexity of $\mathcal{A}'$ is only polynomially larger than that of $\mathcal{A}$ in the AROM. Its success probability is negligibly close to that of $\mathcal{A}$.

Note that, unlike or cryptosystems, Theorem 3.6 does not hold for transforms because there is no way to simulate $\Pi$'s queries to M.

4 Fujisaki-Okamoto in the AROM

Here, we explore the insecurity of the Fujisaki-Okamoto (FO) transform in the AROM. Recall that FO starts with $\Pi_{PKE} = (\text{Gen}_{PKE}, \text{Enc}_{PKE}, \text{Dec}_{PKE})$ and $\Pi_{SKE} = (\text{Enc}_{SKE}, \text{Dec}_{SKE})$, which are public key and secret key encryption schemes. Ciphertexts are then $(c := \text{Enc}_{PKE}(pk, \delta; O(0, \delta, d)), d := \text{Enc}_{SKE}(O(1, \delta), m))$.

Note that, because $\text{Enc}_{PKE}$ never "sees" d, the Type 2 impossibility of the un-tweaked EwH does not seem to apply. For simplicity, we therefore stick with the usual description of FO; we could also define a tweaked version with an s as described herein, and everything we say below will still apply.

That FO is insecure for general PKE already follows from known work following a similar proof as the EwH setting, and the insecurity readily carries over to the AROM following a very similar outline as disclosed herein. In fact, unlike EwH, FO remains insecure in the AROM, even if $\Pi_{PKE}$ is lossy:

Theorem 4.1. For general lossy $\Pi_{PKE}$ and even perfectly secure $\Pi_{SKE}$, FO is not secure in the AROM.

Proof. We start with an oracle $M^O$ which contains families of private random permutations P, Q, and answers the following queries:
- (Gen, $1^\lambda$, s): Output(pk=P(s, 0), sk=s).
- (GenLossy, $1^\lambda$, s): Output pk=P(s, 1).
- (Enc, pk, m, r): If $P^{-1}(pk)=(sk, 0)$ for some sk, output c=Q(pk, m, r). Otherwise output c=Q(pk, 0, r).
- (Dec, sk, c): Compute (pk, m, r)=$Q^{-1}(c)$. If pk=P(sk, 0), output m. Otherwise output $\perp$.
- (Forward, x): Output O(x).

M clearly can be used to realize a lossy encryption scheme $\Pi_{PKE}$. We instantiate $\text{Enc}_{SKE}$ with the one-time pad. Let $\Pi_{FO} = (\text{Gen}_{FO}^{O,\mathcal{M}^O}, \text{Enc}_{FO}^{O,\mathcal{M}^O}, \text{Dec}_{FO}^{O,\mathcal{M}^O})$ be the result of applying the FO transformation to this lossy encryption scheme. Under M as is, $\Pi_{FO}$ actually will be CCA-secure. We now add two more types of queries to M, which make use of another private random oracle R.
- (EncRand, pk): Compute (m, r)=R(pk) and output $c \leftarrow \text{Enc}_{FO}^{O,\mathcal{M}^O}(pk, m; r)$
- (Break, pk, m): Compute (m', r)=R(pk) and (sk, b)$\leftarrow P^{-1}$(pk). If m=m', output sk.

We claim that the addition of these queries preserves the lossiness of $\Pi_{PKE}$. Indeed, suppose an adversary is trying to distinguish pk being lossy from regular. An EncRand query on pk does not help: it is just an encryption of a random ciphertext under FO, which the adversary could simulate for itself. On the other hand, suppose it makes a Break query on (pk, m) that causes it to output sk. Consider the first such query. In this case, the adversary must have been able to previously learn the plaintext encrypted in the EncRand query. Since the query was just a random ciphertext, such an adversary can be turned into an adversary against the CPA-security for $\Pi_{FO}$ in the setting of only Gen, GenLossy, Enc, Dec queries, which we already know is impossible.

However, these queries clearly allow for CCA attacks on $\Pi_{FO}$: simply make an EncRand query on the public key, and then make a CCA query on the resulting ciphertext. Then feed the result into a Break query, revealing the secret key.

The above "attack" is quite general: it is not clear that it used any particular structure of $\Pi_{FO}$. In the following subsection, we will nevertheless show how to modify the construction to achieve CCA security. Very roughly, the way we get around the issue above is by having a public key comprise of several public keys for $\Pi_{PKE}$. What we will see is that this lets us simulate CCA queries by ourselves. Then the ability to perform EncRand and Break queries will directly allow us to break the security of the underlying encryption scheme. Note that our proof will be much more general, applying to any oracle M.

4.1 Our CCA-Secure Construction

Construction 4.2 (CCA-Secure PKE in the AROM). Let $\Pi_{PKE} = (\text{Gen}_{PKE}, \text{Enc}_{PKE}, \text{Dec}_{PKE})$ and $\Pi_{SKE} = (\text{Enc}_{SKE}, \text{Dec}_{SKE})$ be public key and secret key encryption schemes, respectively. Let $\Pi_{Sig} = (\text{Gen}_{Sig}, \text{Sign}_{Sig}, \text{Ver}_{Sig})$ be a signature scheme. Define $\Pi_{CCA} = (\text{Gen}_{CCA}^O, \text{Enc}_{CCA}^O, \text{Dec}_{CCA}^O)$, where $\text{Gen}_{CCA}^O(1^\lambda)$: Let $\ell$ be the bit-length of vk generated by $\text{Gen}_{Sig}(1^\lambda)$. For $i \in [\ell]$, $b \in \{0, 1\}$, run $(pk_{PKE}^{(i,b)}, sk_{PKE}^{(i,b)}) \leftarrow \text{Gen}_{PKE}(1^\lambda)$. Output $pk_{CCA} = (pk_{PKE}^{(i,b)})_{i,b}$ and $sk_{CCA} = ((sk_{PKE}^{(i,b)})_{i,b}, pk_{CCA})$.

$\text{Enc}_{CCA}^O(pk_{CCA}, m)$: Sample $(vk, sk_{Sig}) \leftarrow \text{Gen}_{Sig}(1^\lambda)$. Sample $\delta \leftarrow \{0, 1\}^\lambda$. Run $d \leftarrow \text{Enc}_{SKE}(O(vk, \delta), m)$, $c_i \leftarrow \text{Enc}_{PKE}(\text{pk}_{PKE}^{(i,vk_i)}, \delta; O(\delta, i, d, vk))$ for $i \in [\ell]$. Finally compute $\sigma \leftarrow \text{Sign}_{Sig}(\text{sk}_{Sig}, ((c_i)_i, d))$. Output $c = (vk, (c_i)_i, d, \sigma)$.

$\text{Dec}_{CCA}^{O}(\text{sk}_{CCA}, c)$: First run $\text{Ver}_{Sig}(vk, ((c_i)_i, d), \sigma)$; if it rejects immediately abort and output $\bot$. Otherwise run $\delta \leftarrow \text{Dec}_{PKE}(\text{sk}_{PKE}^{(1,vk_1)}, c_1)$. For each $i>1$, check that $c_i = \text{Enc}_{PKE}(\text{pk}_{PKE}^{(i,vk_i)}, \delta; O(\delta, i, d, vk))$; if any of the checks fail immediately abort and output $\bot$.

Finally, output $m \leftarrow \text{Dec}_{SKE}(O(vk, \delta), d)$.

Correctness is immediate from the correctness of the underlying protocols. We now state the security theorem:

Theorem 4.3. If $\Pi_{PKE}$ is lossy, $\Pi_{SKE}$ is one-time secure, and $\Pi_{Sig}$ is strongly one-time secure, then $\Pi_{CCA}$ is CCA secure in the AROM.

Proof. Consider a distribution $\mathcal{M}$ over oracles M and schemes $\Pi_{PKE}$, $\Pi_{SKE}$, $\Pi_{SKE}$ that are secure in the $\mathcal{M}$-AROM. Let $\mathcal{A}^{O,\mathcal{M}^O}$ be a CCA adversary with advantage $\epsilon$. We prove security though a sequence of hybrids:

Hybrid 0. This is the CCA experiment with b=0, meaning $m^*_0$ is encrypted. Let $p_0$ be the probability the adversary outputs 1. Let $(vk^*, \text{sk}_{Sig}^*)$ be the signature keys generated for the challenge ciphertext. Note that we can sample these at the beginning of the experiment.

Hybrid 1. This is identical to Hybrid 0, except that we respond with $\bot$ to any CCA query $(vk, (c_i)_i, d, \sigma)$ such that $vk = vk^*$. Let $p_1$ be the probability $\mathcal{A}$ outputs 1.

The only difference between Hybrid 0 and Hybrid 1 occurs if there is a CCA query where $\sigma$ is a valid signature on $((c_i)_i, d)$ relative to $vk^*$. Since CCA queries must be distinct from the challenge query, this immediately yields a signature forgery. By straightforward reduction from the strong 1-time security of $\Pi_{Sig}$, we have that $|p_1 - p_0|$ is negligible.

Hybrid 2. This is identical to Hybrid 1, except that in answering CCA queries, we replace $\delta \leftarrow \text{Dec}_{PKE}(\text{sk}_{PKE}^{(1,vk_1)}, c_1)$ with $\delta \leftarrow \text{Dec}_{PKE}(\text{sk}_{PKE}^{(j,vk_j)}, c_1)$, where j is the first index such that $vk_j \neq vk^*_j$. Since $vk \neq vk^*$ such an index must exist. Since $\text{Dec}_{CCA}$ always checks that $c_i = \text{Enc}_{PKE}(\text{pk}_{PKE}^{(i,vk_i)}, \delta; O(\delta, i, d, vk))$ for all i, the correctness of $\Pi_{PKE}$ implies that there is negligible probability this change will affect the output of the CCA query. Therefore, if $p_2$ is the probability $\mathcal{A}$ outputs 1, we have $|p_2 - p_1|$ is negligible. Note that, in Hybrid 2, we no longer need $\text{sk}_{PKE}^{(i,vk^*_i)}$ for any i.

Hybrid 3. This is identical to Hybrid 2, except we change $\text{pk}_{PKE}^{(i,vk^*_i)} \leftarrow \text{GenLossy}_{PKE}(1^\lambda)$. If $p_3$ is the probability $\mathcal{A}$ outputs 1, we have $|p_3 - p_2|$ is negligible, by straightforward reduction to the lossiness of $\Pi_{PKE}$.

Hybrid 4. The challenge ciphertext contains $d^* \leftarrow \text{Enc}_{SKE}(O(vk^*, \delta^*), m^*_0)$ and the various $c^*_i \leftarrow \text{Enc}_{PKE}(\text{pk}_{PKE}^{(i,vk^*_i)}, \delta; O(\delta^*, i, d^*, vk^*))$. In Hybrid 4, we replace these with $d^* \leftarrow \text{Enc}_{SKE}(k^*, m^*_0)$ for a uniform key $k^*$ and $c^*_i \leftarrow \text{Enc}_{PKE}(\text{pk}_{PKE}^{(i,vk^*_i)}, \delta)$ using fresh randomness for each ciphertext.

That $|p_4 - p_3|$ is negligible follows from analogous arguments that Hybrid 3 and 4 are identical until there is a query to $O(\delta^*, i, d^*, vk^*)$ or $O(vk^*, \delta^*)$ occurring outside the generation of the $d, c^*_i$. But in Hybrid 4, by the lossiness of $\text{pk}_{PKE}^{(i,vk^*_i)}$, the entire experiment is independent of the random $\delta^*$ up until such a query. So the probability of querying O on any of these queries is therefore negligible.

Hybrid 5. Here we replace $d^* \leftarrow \text{Enc}_{SKE}(k^*, m^*_0)$ with $d^* \leftarrow \text{Enc}_{SKE}(k^*, m^*_1)$. If we let $p_5$ be the probability A outputs 1, then $|p_5 - p_4|$ is negligible by the one-time security of $\Pi_{SKE}$.

Hybrids 6, 7, 8, 9. These are identical to Hybrids 3, 2, 1, and 0, except that $m^*_0$ is replaced by $m^*_1$. Let $p_6, p_7, p_8, p_9$ be the probabilities of outputting 1. Analogous arguments show that $|p_6 - p_5|, |p_7 - p_6|, |p_8 - p_7|, |p_9 - p_8|$ are negligible.

Hence $|p_9 - p_0|$ is negligible. But notice that Hybrid 9 is exactly the CCA game with b=1, and so $|p_9 - p_0| = \epsilon$ is the advantage of $\mathcal{A}$. This completes the proof.

System Implementations

FIG. 1 illustrates example systems and methods for encryption and decryption according to one embodiment. The method for public key encryption can include establishing a hash function O, a public key encryption scheme, a signature scheme, and a secret key encryption scheme (101); generating 2×l private keys (103); generating 2×l public keys (102); and receiving a message m (104).

The system then executes encrypting the message m to a ciphertext (105) by:
a. generating verification key vk, wherein l is a bit length of the verification key vk, and a signing key for the signature scheme;
b. choosing a random bitstring $\delta$, having a length determined by a security parameter $\lambda$;
c. computing a hash of the verification key vk combined with a bitstring delta as value k;
d. encrypting message m using the secret key encryption scheme wherein the key is set to k to generate result d;
e. selecting a subset of l of the public keys as $pk_1 \ldots pk_l$, wherein the selection is based on one or more bits of vk;
f. computing l number of hashes as $g_i$ for $g_1 \ldots g_l$ by applying the hash function O to the combination of $\delta$, i, d, and vk;
g. using iterator i, computing l ciphertexts $c_i$, by encrypting random bitstring $\delta$ using the public key $pk_i$, and using the $g_i$ to generate the random bits; and
h. combining $c_1$ to $c_l$ and d, and signing the result of the combining using the signing key for the signature scheme, as $\sigma$.

The system then executes storing the ciphertext as the combination of vk, $c_1 \ldots c_l$, d, and $\sigma$.

To decrypt, the system can perform decrypting a ciphertext by (107): extracting verification key vk, ciphertexts $c_1 \ldots c_l$, encrypted value d, and signature a from the ciphertext; combining $c_1$ to $c_l$ and d, and verifying that a is a valid signature on the combination; selecting a subset of l of the secret keys as $sk_1 \ldots sk_l$, wherein the selection is based on one or more bits of vk; decrypting $c_1$ using the secret key $sk_1$, as $\delta$; computing l number of hashes as $g_i$ for $g_1 \ldots g_l$ by applying a hash function to the combination of $\delta$, i, d, and vk; using iterator i, computing l ciphertexts $c'_i$, by encrypting delta using the public key $pk_i$, further comprising using the g to generate the random bits; verifying that $c_1 = c'_1, c_2 = c'_2, \ldots$, and $c_l = c'_l$; computing a hash of the verification key vk combined with the delta bitstring as value k; decrypting d using the secret key encryption scheme wherein the key is set to k to generate the result m; and outputting m as the decrypted message.

Figure 2:
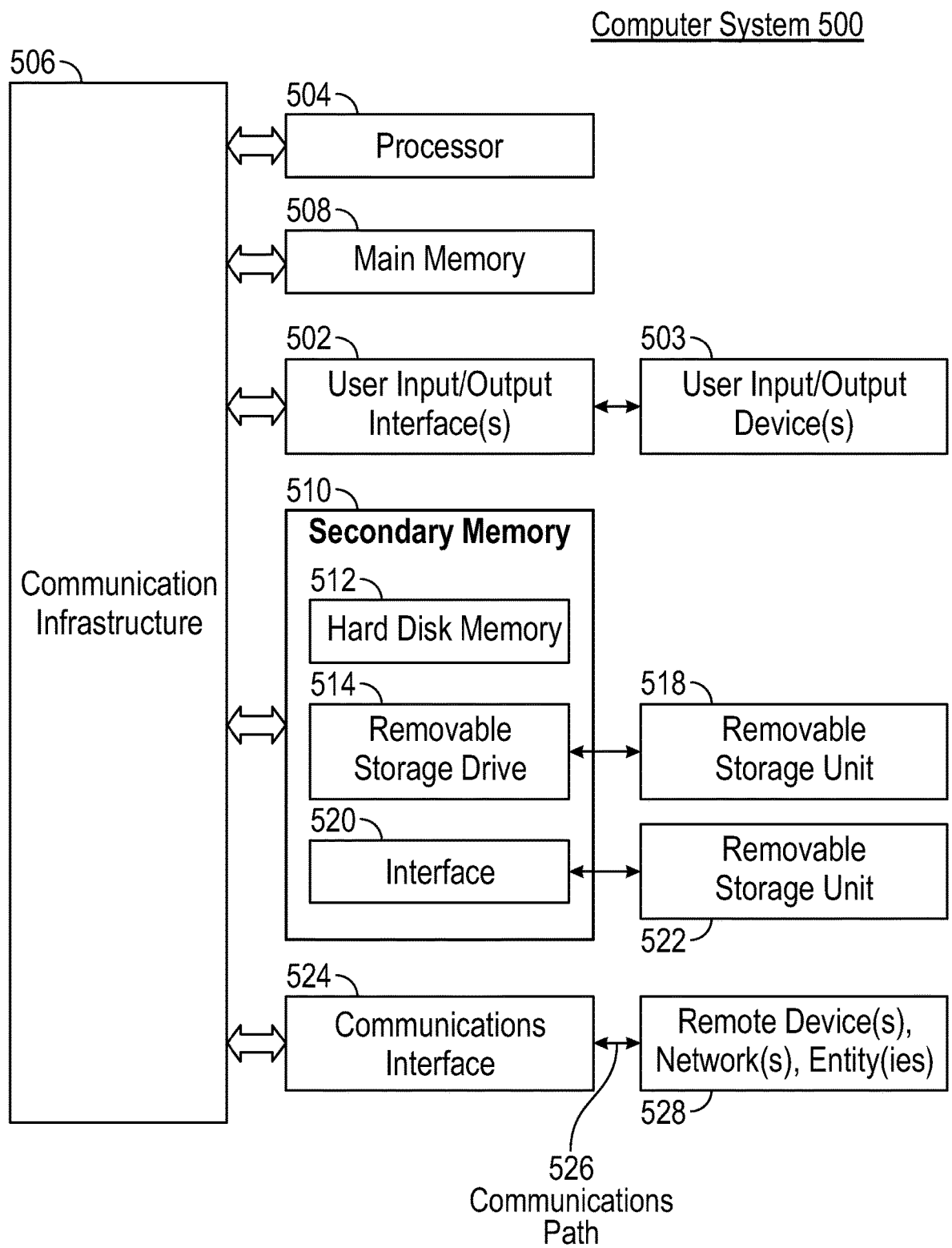
FIG. 2 illustrates an example computer system architecture for implementing the claimed systems and methods.
Figure 3:
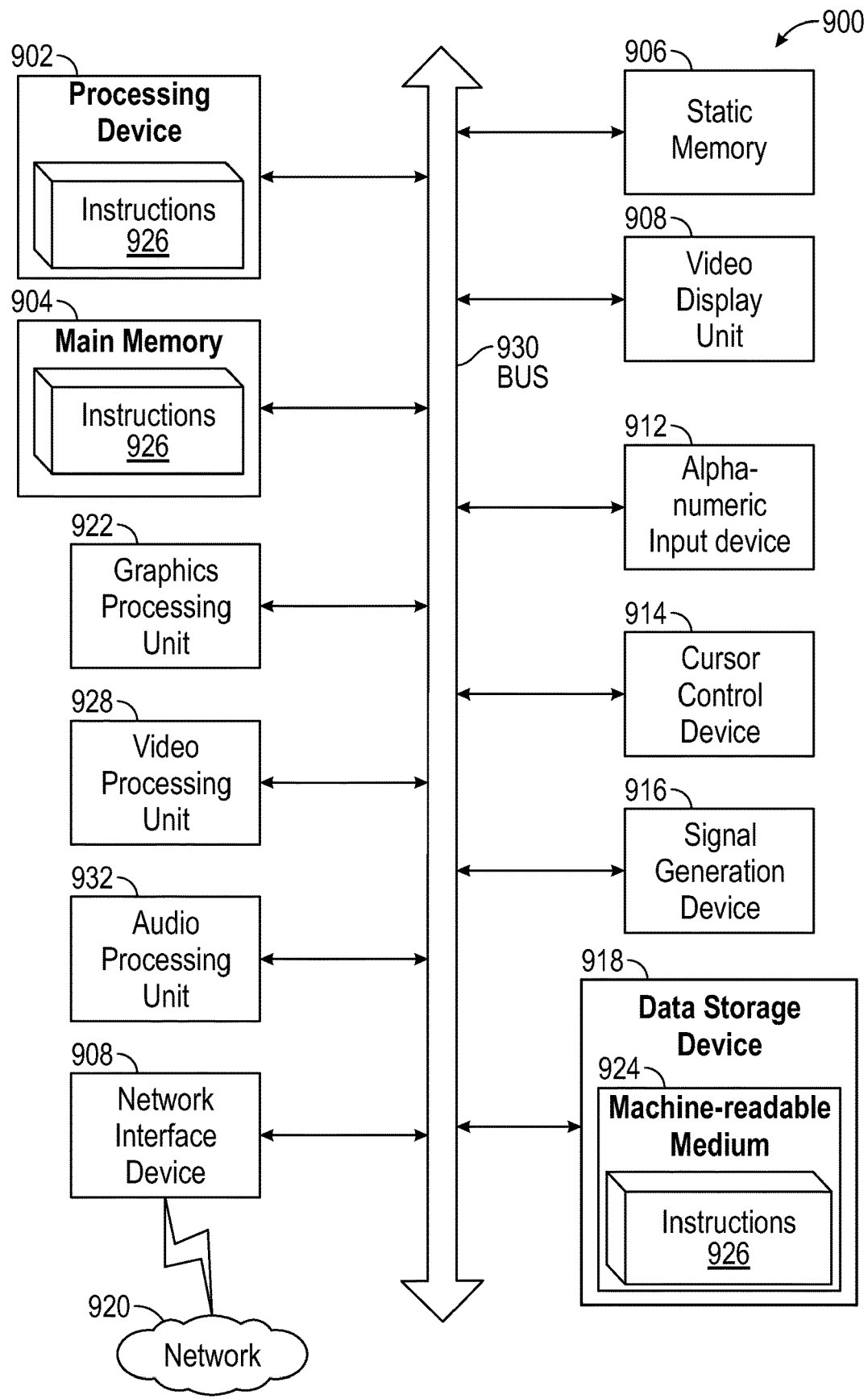
FIG. 3 illustrates further details of an example computer system architecture for implementing the claimed systems and methods.

FIGS. 2 and 3 depict example computer systems useful for implementing various embodiments described in the present disclosure. Various embodiments may be implemented, for example, using one or more computer systems, such as computer system 500 shown in FIG. 2. One or more computer system(s) 500 may be used, for example, to implement any of the embodiments discussed herein, as well as combinations and sub-combinations thereof.

Computer system 500 may include one or more processors (also called central processing units, processing devices, or CPUs), such as a processor 504. Processor 504 may be connected to a communication infrastructure 506 (e.g., such as a bus).

Computer system 500 may also include user input/output device(s) 503, such as monitors, keyboards, pointing devices, etc., which may communicate with communication infrastructure 506 through user input/output interface(s) 502. One or more of processors 504 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 500 may also include a main memory 508, such as random-access memory (RAM). Main memory 508 may include one or more levels of cache. Main memory 508 may have stored therein control logic (i.e., computer software, instructions, etc.) and/or data. Computer system 500 may also include one or more secondary storage devices or secondary memory 510. Secondary memory 510 may include, for example, a hard disk drive 512 and/or a removable storage device or removable storage drive 514. Removable storage drive 514 may interact with a removable storage unit 518. Removable storage unit 518 may include a computer-usable or readable storage device having stored thereon computer software (control logic) and/or data. Removable storage drive 514 may read from and/or write to removable storage unit 518.

Secondary memory 510 may include other means, devices, components, instrumentalities, or other approaches for allowing computer programs and/or other instructions and/or data to be accessed by computer system 500. Such means, devices, components, instrumentalities, or other approaches may include, for example, a removable storage unit 522 and an interface 520. Examples of the removable storage unit 522 and the interface 520 may include a program cartridge and cartridge interface, a removable memory chip (such as an EPROM or PROM) and associated socket, a memory stick and USB port, a memory card and associated memory card slot, and/or any other removable storage unit and associated interface.

Computer system 500 may further include communications interface 524 (e.g., network interface). Communications interface 524 may enable computer system 500 to communicate and interact with any combination of external devices, external networks, external entities, etc. (individually and collectively referenced as remote device(s), network(s), entity(ies) 528). For example, communications interface 524 may allow computer system 500 to communicate with external or remote device(s), network(s), entity(ies) 528 over communications path 526, which may be wired and/or wireless (or a combination thereof), and which may include any combination of LANs, WANs, the Internet, etc. Control logic and/or data may be transmitted to and from computer system 500 via communications path 526.

Computer system 500 may also be any of a personal digital assistant (PDA), desktop workstation, laptop or notebook computer, netbook, tablet, smartphone, smartwatch or other wearable devices, appliance, part of the Internet-of-Things, and/or embedded system, to name a few non-limiting examples, or any combination thereof.

Computer system 500 may be a client or server computing device, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

FIG. 3 illustrates an example machine of a computer system 900 within which a set of instructions, for causing the machine to perform any one or more of the operations discussed herein, may be executed. In alternative implementations, the machine may be connected (e.g., networked) to other machines in a LAN, an intranet, an extranet, and/or the Internet. The machine may operate in the capacity of a server or a client machine in a client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, a specialized application or network security appliance or device, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 900 includes a processing device 902, a main memory 904 (e.g., read-only memory (ROM), flash memory, dynamic random-access memory (DRAM) such as synchronous DRAM (SDRAM), etc.), a static memory 906 (e.g., flash memory, static random-access memory (SRAM), etc.), and a data storage device 918, which communicate with each other via a bus 930.

Processing device 902 represents one or more processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 902 may also be one or more special-purpose processing devices such as an application-specific integrated circuit (ASIC), a field-programmable gate array (FPGA), a digital signal processor (DSP), network processor, or the like. The processing device 902 is configured to execute instructions 926 for performing the operations and steps discussed herein.

The computer system 900 may further include a network interface device 908 to communicate over the network 920. The computer system 900 also may include a video display unit 910, an alphanumeric input device 912 (e.g., a keyboard), a cursor control device 914 (e.g., a mouse), a graphics processing unit 922, a signal generation device 916 (e.g., a speaker), graphics processing unit 922, video processing unit 928, and audio processing unit 932.

The data storage device 918 may include a machine-readable medium 924 (also known as a computer-readable storage medium) on which is stored one or more sets of instructions 926 (e.g., software instructions) embodying any one or more of the operations described herein. The instructions 926 may also reside, completely or at least partially, within the main memory 904 and/or within the processing device 902 during execution thereof by the computer system 900, where the main memory 904 and the processing device 902 also constitute machine-readable storage media.

In an example, the instructions 926 include instructions to implement operations and functionality corresponding to the disclosed subject matter. While the machine-readable storage medium 924 is shown in an example implementation to be a single medium, the term "machine-readable storage medium" should be taken to include a single medium or multiple media (e.g., a centralized or distributed database, and/or associated caches and servers) that store the one or more sets of instructions 926. The term "machine-readable storage medium" shall also be taken to include any medium that is capable of storing or encoding a set of instructions 926 for execution by the machine and that cause the machine to perform any one or more of the operations of the present disclosure. The term "machine-readable storage medium" shall accordingly be taken to include, but not be limited to, solid-state memories, optical media, and magnetic media.

Some portions of the detailed description have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a computer selectively activated or reconfigured by a computer program stored in the computer. Such a computer program may be stored in a computer-readable storage medium, such as but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The operations and illustrations presented herein are not inherently related to any particular computer or other apparatus. Various types of systems may be used with programs in accordance with the teachings herein, or it may prove convenient to construct a more specialized apparatus to perform the operations. The structure for a variety of these systems will appear as set forth in the description herein. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as read-only memory ("ROM"), random access memory ("RAM"), magnetic disk storage media, optical storage media, flash memory devices, etc.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 500, main memory 508, secondary memory 510, and removable storage units 518 and 522, as well as tangible articles of manufacture embodying any combination of the foregoing. Such control logic, when executed by one or more data processing devices (such as computer system 500), may cause such data processing devices to operate as described herein.

Based on the teachings contained in this disclosure, it will be apparent to persons skilled in the relevant art(s) how to make and use embodiments of this disclosure using data processing devices, computer systems, and/or computer architectures other than that shown in FIGS. 2 and 3. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible and are within the scope and spirit of this disclosure. For example, and without limiting the generality of this paragraph, embodiments are not limited to the software, hardware, firmware, and/or entities illustrated in the figures described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments but should be defined only in accordance with the following claims and their equivalents. In the foregoing specification, implementations of the disclosure have been described with reference to specific example implementations thereof. It will be evident that various modifications may be made thereto without departing from the broader spirit and scope of implementations of the disclosure as set forth in the following claims. The specification and drawings are, accordingly, to be regarded in an illustrative sense rather than a restrictive sense.

The invention claimed is:

1. A method for public key encryption executing on a computerized hardware processor, the method comprising:
   establishing a hash function O, a public key encryption scheme, a signature scheme, and a secret key encryption scheme;
   generating 2×l private keys;
   generating 2×l public keys;
   receiving a message m;
   encrypting the message m to a ciphertext by:
   a. generating a verification key vk, wherein l is a bit length of the verification key vk, and generating a signing key for the signature scheme;
   b. choosing a random bitstring δ, having a length determined by a security parameter λ;
   c. computing a hash of the verification key vk combined with the bitstring δ as a value k;
   d. encrypting the message m using the secret key encryption scheme wherein the key is set to k to generate a result d;
   e. selecting a subset of l of the 2×l public keys as $pk_1 \ldots pk_l$, wherein the selection is based on one or more bits of vk;
   f. computing l number of hashes as $g_i$ for $g_1 \ldots g_l$ by applying the hash function O to the combination of δ, i, d, and vk;
   g. using an iterator i, computing l ciphertexts ci, by encrypting the random bitstring δ using the public key $pk_i$, and using the $g_i$ to generate random bits;
   h. combining $c_1$ to $c_l$ and d, and signing a result of the combining using the signing key for the signature scheme as σ; and
   storing the ciphertext as a combination of vk, $c_1 \ldots c_l$, d and σ.

2. A method for public key decryption, the method comprising:
   decrypting a ciphertext by:
   a. extracting a verification key vk, ciphertexts $c_1 \ldots c_l$, an encrypted value d, and a signature σ from the ciphertext;
   b. combining $c_1$ to $c_l$ and d, and verifying that σ is a valid signature on the combination;
   c. selecting a subset of l of 2×l secret keys as $sk_1 \ldots sk_l$, wherein the selection is based on one or more bits of vk;
   d. decrypting $c_1$ using the secret key $sk_1$, as bitstring δ;
   e. computing l number of hashes as $g_i$ for $g_1 \ldots g_l$ by applying a hash function to the combination of δ, i, d, and vk;
   f. using an iterator i, computing l ciphertexts $c'_i$, by encrypting bitstring δ using a public key $pk_i$, further comprising using the $g_i$ to generate random bits;
   g. verifying that $c_1 = c'_1, c_2 = c'_2, \ldots,$ and $c_l = c'_l$;
   h. computing a hash of the verification key vk combined with the bitstring δ as a value k;
   i. decrypting d using a secret key encryption scheme wherein the key is set to k to generate a result m; and
   outputting m as a decrypted message.

3. A system for public key encryption, the system comprising:
   a computerized hardware processor configured for:
   establishing a hash function O, a public key encryption scheme, a signature scheme, and
   a secret key encryption scheme;
   generating 2×l private keys;
   generating 2×l public keys;
   receiving a message m;
   encrypting the message m to a ciphertext by:
   a. generating a verification key vk, wherein l is a bit length of the verification key vk, and generating a signing key for the signature scheme;
   b. choosing a random bitstring δ, having a length determined by a security parameter λ;
   c. computing a hash of the verification key vk combined with the bitstring δ as a value k;
   d. encrypting the message m using the secret key encryption scheme wherein the key is set to k to generate a result d;
   e. selecting a subset of l of the 2×l public keys as $pk_1 \ldots pk_l$, wherein the selection is based on one or more bits of vk;
   f. computing l number of hashes as $g_i$ for $g_1 \ldots g_l$ by applying the hash function O to the combination of δ, i, d, and vk;
   g. using an iterator i, computing l ciphertexts $c_i$, by encrypting the random bitstring δ using the public key $pk_i$, and using the $g_i$ to generate random bits;
   h. combining $c_1$ to $c_l$ and d, and signing a result of the combining using the signing key for the signature scheme, as σ; and
   storing the ciphertext as a combination of vk, $c_1 \ldots c_l$, d, and σ.

4. A system for public key decryption, the system comprising:
a computerized hardware processor configured for:
  decrypting a ciphertext by:
  a. extracting a verification key vk, ciphertexts $c_1 \ldots c_l$, an encrypted value d, and a signature σ from the ciphertext;
  b. combining $c_1$ to $c_l$ and d, and verifying that σ is a valid signature on the combination;
  c. selecting a subset of l of 2×l secret keys as $sk_1 \ldots sk_l$, wherein the selection is based on one or more bits of vk;
  d. decrypting $c_1$ using the secret key $sk_1$, as bitstring δ;
  e. computing l number of hashes as $g_i$ for $g_1 \ldots g_l$ by applying a hash function to the combination of δ, i, d, and vk;
  f. using an iterator i, computing l ciphertexts $c'_i$, by encrypting the bitstring δ using a public key $pk_i$, further comprising using the $g_i$ to generate random bits;
  g. verifying that $c_1 = c'_1, c_2 = c'_2, \ldots,$ and $c_l = c'_l$;
  h. computing a hash of the verification key vk combined with the bitstring δ as a value k;
  i. decrypting d using a secret key encryption scheme wherein the key is set to k to generate a result m; and
  outputting m as a decrypted message.

5. A non-transitory computer-readable media containing instructions that upon execution cause a computerized processor to perform public key encryption by:
establishing a hash function O, a public key encryption scheme, a signature scheme, and a secret key encryption scheme;
generating 2×l private keys;
generating 2×l public keys;
receiving a message m;
encrypting the message m to a ciphertext by:
  a. generating a verification key vk, wherein l is a bit length of the verification key vk, and generating a signing key for the signature scheme;
  b. choosing a random bitstring δ, having a length determined by a security parameter λ;
  c. computing a hash of the verification key vk combined with the bitstring δ as a value k;
  d. encrypting the message m using the secret key encryption scheme wherein the key is set to k to generate a result d;
  e. selecting a subset of l of the 2×l public keys as $pk_1 \ldots pk_l$, wherein the selection is based on one or more bits of vk;
  f. computing l number of hashes as $g_i$ for $g_1 \ldots g_l$ by applying the hash function O to the combination of δ, i, d, and vk;
  g. using an iterator i, computing l ciphertexts $c_i$, by encrypting the random bitstring δ using the public key $pk_i$, and using the $g_i$ to generate random bits;
  h. combining $c_1$ to $c_l$ and d, and signing a result of the combining using the signing key for the signature scheme, as σ; and
storing the ciphertext as a combination of vk, $c_1 \ldots c_l$, d, and σ.

6. A non-transitory computer-readable media containing instructions that upon execution cause a computerized processor to perform public key decryption by:
decrypting a ciphertext by:
  a. extracting a verification key vk, ciphertexts $c_1 \ldots c_l$, an encrypted value d, and a signature σ from the ciphertext;
  b. combining $c_1$ to $c_l$ and d, and verifying that σ is a valid signature on the combination;
  c. selecting a subset of l of 2×l secret keys as $sk_1 \ldots sk_l$, wherein the selection is based on one or more bits of vk;
  d. decrypting $c_1$ using the secret key $sk_1$, as a bitstring δ;
  e. computing l number of hashes as $g_i$ for $g_1 \ldots g_l$ by applying a hash function to the combination of δ, i, d, and vk;
  f. using an iterator i, computing l ciphertexts $c'_i$, by encrypting the bitstring δ using a public key $pk_i$, further comprising using the $g_i$ to generate random bits;
  g. verifying that $c_1 = c'_1, c_2 = c'_2, \ldots,$ and $c_l = c'_l$;
  h. computing a hash of the verification key vk combined with the bitstring δ as a value k;
  i. decrypting d using a secret key encryption scheme wherein the key is set to k to generate a result m; and
outputting m as a decrypted message.

7. The method of claim 1, wherein the computerized hardware processor is further configured to:
  (a) generate a plurality of lossy public keys using a lossy key generation algorithm;
  (b) select a subset of the lossy public keys based on bits of the verification key vk; and
  (c) use the selected lossy public keys for encrypting the random bitstring δ.

8. The method of claim 1, wherein the hash function O is implemented as an augmented random oracle that provides complexity-preserving and simulatable properties.

9. The method of claim 2, further comprising:
  (a) verifying the signature a using a strong one-time secure signature scheme; and
  (b) aborting the decryption process if the signature verification fails.

10. The method of claim 2, wherein the computerized hardware processor is further configured to:
  (a) implement the secret key encryption scheme as a one-time pad; and
  (b) use the hash value k as the one-time pad key for decrypting d.

11. The system of claim 3, wherein the computerized hardware processor is further configured to:
  (a) implement the public key encryption scheme as a lossy encryption scheme; and
  (b) generate the public keys $pk_1 \ldots pk_l$ using a lossy key generation algorithm.

12. The system of claim 3, wherein the computerized hardware processor is further configured to:
  (a) implement the hash function O as an augmented random oracle; and
  (b) use the augmented random oracle to provide both complexity-preserving and simulatable properties.

13. The system of claim 4, wherein the computerized hardware processor is further configured to:
   (a) abort the decryption process if any of the verifications in steps b or g fail; and
   (b) implement a strong one-time secure signature scheme for signature verification.

14. The system of claim 4, wherein the computerized hardware processor is further configured to:
   (a) implement the secret key encryption scheme as a one-time pad; and
   (b) use the hash value k as the one-time pad key for decrypting d.

15. The non-transitory computer-readable media of claim 5, wherein the instructions further cause the computerized processor to:
   (a) implement the public key encryption scheme as a lossy encryption scheme; and
   (b) generate the public keys $pk_1 \ldots pk_l$ using a lossy key generation algorithm.

16. The non-transitory computer-readable media of claim 5, wherein the instructions further cause the computerized processor to:
   (a) implement the hash function O as an augmented random oracle; and
   (b) use the augmented random oracle to provide both complexity-preserving and simulatable properties.

17. The non-transitory computer-readable media of claim 6, wherein the instructions further cause the computerized processor to:
   (a) abort the decryption process if any of the verifications in steps b or g fail; and
   (b) implement a strong one-time secure signature scheme for signature verification.

18. The non-transitory computer-readable media of claim 6, wherein the instructions further cause the computerized processor to:
   (a) implement the secret key encryption scheme as a one-time pad; and
   (b) use the hash value k as the one-time pad key for decrypting d.

19. The method of claim 1, wherein the computerized hardware processor is further configured to:
   (a) implement the signature scheme as a strong one-time secure signature scheme; and
   (b) use the strong one-time secure signature scheme to generate and verify the signature $\sigma$.

20. The method of claim 2, wherein the computerized hardware processor is further configured to:
   (a) implement the public key encryption scheme as a lossy encryption scheme; and
   (b) use the lossy encryption scheme properties to enhance the security of the decryption process.

* * * * *